(12) United States Patent
Eckert (10) Patent No.: US 8,379,768 B2
(45) Date of Patent: Feb. 19, 2013

(54) METHOD AND ARRANGEMENT FOR GENERATING SOFT BIT INFORMATION IN A RECEIVER OF A MULTIPLE ANTENNA SYSTEM

(75) Inventor: Sebastian Eckert, Burgstadt/Mohsdorf (DE)

(73) Assignee: NXP B.V., Eindhoven (NL)

( * ) Notice: Subject to any disclaimer, the term of this patent is extended or adjusted under 35 U.S.C. 154(b) by 906 days.

(21) Appl. No.: 12/515,790

(22) PCT Filed: Oct. 2, 2007

(86) PCT No.: PCT/IB2007/054002
§ 371 (c)(1),
(2), (4) Date: May 21, 2009

(87) PCT Pub. No.: WO2008/062329
PCT Pub. Date: May 29, 2008

(65) Prior Publication Data
US 2010/0054372 A1 Mar. 4, 2010

(30) Foreign Application Priority Data
Nov. 24, 2006 (EP) ..................... 06024438

(51) Int. Cl.
*H04L 27/06* (2006.01)
(52) U.S. Cl. ........ 375/340; 375/260; 375/262; 375/267; 375/341; 375/347; 455/101; 455/132; 455/500; 455/562.1; 714/794; 714/795; 714/796; 370/334
(58) Field of Classification Search .......... 375/260, 375/262, 267, 340, 341, 347; 455/101, 132, 455/500, 562.1; 714/794, 795, 796; 370/334
See application file for complete search history.

(56) References Cited

FOREIGN PATENT DOCUMENTS

| EP | 1 578 075 A | 9/2005 |
|---|---|---|
| GB | 2 426 419 A | 11/2006 |
| WO | 2006/029546 A | 3/2006 |

OTHER PUBLICATIONS

Chan, Albert M., et al; "A New Reduced-Complexity Sphere Decoder for Multiple Antenna Systems"; 2002 IEEE.

(Continued)

*Primary Examiner* — Leon Flores (57) ABSTRACT

The invention which relates to a method and to an arrangement for generating soft bit information in a receiver of a multiple antenna system is based on the object of reducing the calculation complexity for generating the soft bit information. In terms of the method, the object is achieved by virtue of the fact that the iterative deepening search for the Mh antenna is carried out in two substeps, in which case, in the first substep, when the last element of s is not assigned to the mth antenna, s is rotated in such a manner that m is associated with the last element of s, that the channel matrix H is likewise rotated and QR decomposition of the channel matrix H is carried out, that, in the second substep, the iterative deepening search is carried out using a search radius in the form of a vector (Formula (I)); in which (Formula (II)) denotes the number of bit positions in the mth antenna, that the comparison (Formula (III))$\geq d^2$ is carried out for a search radius vector (Formula (IV)) and the search radius is adapted by setting the vector element (Formula (IV)) ( . . . ) of the search vector (Formula (IV)) to the value of the Euclidean distance corresponding to the condition satisfied, that the iterative deepening search is carried out as long as at least one search radius (Formula (IV)) ( . . . ) from the radius vector (Formula (IV)) satisfies the condition (Formula (III))$\geq d^2$ or the comparisons with all of the transmission symbols s(m) of all $N_{Tx}$ antennas have been carried out, that the soft bit information (Formula (V)) for the antenna m is output, and that the substeps of the method are run through again until all of the soft bit information (Formula (V)) has been determined for all $N_{Tx}$ antennas.

5 Claims, 5 Drawing Sheets

OTHER PUBLICATIONS

Hassibi, Babak, et al; "On the Sphere Decoding Algorithm I. Expected Complexity"; IEEE Transactions on Signal Processing vol. 53, No. 8; pp. 2806-2818; Aug. 2005.

Burg, Andreas, et al; "VLSI Implementation of MIMO Detection Using the Sphere Decoding Algorithm"; IEEE Journal of Solid State Circuits; vol. 40, No. 7; Jul. 2005.

Wang, Renqiu, et al; "Approaching MIMO Channel Capacity With Soft Detection Based on Hard Sphere Decoding"; Wireless Communications and Networking Conference 2004; IEEE vol. 3; Mar. 21, 2004; pp. 1620-1625; XP010708038; ISBN: 978-0-7803-8344-9.

Wang, Renqiu, et al; "Approaching MIMO Channel Capacity With Soft Detection Based on Hard Sphere Decoding"; IEEE Transactions on Communications IEEE, USA; vol. 54, No. 4, Apr. 2006; pp. 587-590; XP002483585; ISSN: 0090-6678.

METHOD AND ARRANGEMENT FOR GENERATING SOFT BIT INFORMATION IN A RECEIVER OF A MULTIPLE ANTENNA SYSTEM

The invention relates to a method for generating soft bit information in a receiver of a multiple antenna system, in which soft bit information $\rho_k^m$, where $k=(1, 2, \ldots, N_{bits}^m)$, where $N_{bits}^m$ specifies the number of bit positions in a symbol determined by the modulation and m specifies the number of a transmitting antenna, is formed from a reception vector y using a value set Q of possible transmission symbols.

The invention also relates to an arrangement for implementing the method for generating soft bit information in a receiver of a multiple antenna system.

In multiple input—multiple output communication systems (MIMO), the transmission model in the frequency domain can be described using an $N_{Rx}$ dimensional reception vector y, where $y=[y_1, \ldots, y_{N_{Rx}}]^T$, and an $N_{Tx}$ dimensional transmission vector s, where $s=[s(1), \ldots, s(N_{Tx})]^T$.

In this case, $N_{Rx}$ is used to denote the number of receiving antennas used and $N_{Tx}$ is used to denote the number of transmitting antennas used.

The parts of s(m) which are contained in s thus correspond, for example, to the complex QAM symbol which is sent on the basis of QAM modulation $Q^m$ which is used for a particular transmitting antenna m.

The channel matrix H with the complex elements H(n,m) describes the transmission behavior between the transmitting and receiving antennas, where H(n,m) represents the transfer function from the mth transmitting antenna to the nth receiving antenna. Therefore, H is an $N_{Rx} \times N_{Tx}$ matrix.

The system model can be described by $$y = Hs + n \quad (1)$$

where $n=[n(1), \ldots, n(N_{Rx})]^T$ is an $N_{Rx}$ dimensional uncorrelated noise vector which takes into account the interference influence caused by the noise in each receiving antenna.

The prior art distinguishes between the methods for the hard decision and soft decision decoding of the received information.

For a hard decision receiver concept, it is necessary to find those symbol vectors $s_{min}$ which were transmitted with the highest degree of probability.

For this purpose, the Euclidean distances $$d^2 = \|y - Hs\|^2 \quad (2)$$

are taken into account, the symbol vector $s_{min}$ sought being found by means of a minimum search within the values calculated for $d^2$.

$$s_{min} = \arg\min_{s \in Q}\{\|y - Hs\|^2\} \quad (3)$$

The notation $s \in Q$ is used to show that $s_{min}$ is selected from the set of all possible symbol vectors—the so-called set of symbols Q.

Consequently, the number of all possible symbol vectors $|Q|$ is determined by the number of all possible QAM symbols $|Q^m|$ for each transmitting antenna m using the following equation:

$$|Q| = \prod_{m=0}^{N_{Tx}} |Q^m| \quad (4)$$

As soon as the symbol vector $s_{min}$ has been determined, the received bits are determined in accordance with the method of a hard decision receiver and can thus assume only the value 0 or 1 in accordance with the binary pattern $b(m)=\lfloor b^m(1), \ldots, b^m(N_{bit}^m)\rfloor$ for each element $s_{min}(m)$ of $s_{min}$.

In order to make full use of the resources of a channel decoder, for example a Viterbi decoder, the received bits should not have the values of 0 or 1 which are conventional in accordance with a hard decision.

When BPSK modulation is used, for example, a hard decision provides a 0 or 1 or −1 or 1 and thus a decision on the mathematical sign. In contrast, apart from the mathematical sign, a soft decision additionally provides information regarding the distance between the value which has been decided and the decision threshold.

It is thus more advantageous to calculate this so-called soft bit information $\rho_k^m$ (log-likelihood ratio, LLR).

For the kth bit which is transmitted using the mth transmitting antenna, the value of the soft bit information can be given by $$\rho_k^m = \min_{s \in Q_k^m}\{\|y - Hs\|^2\} - \min_{s \in \overline{Q_k^m}}\{\|y - Hs\|^2\} \quad (5)$$

In this equation (5), two selected partial value sets $Q_k^m$ and $\overline{Q_k^m}$ are determined from a value set Q of possible transmission vectors $s \in Q$.

The partial value set $Q_k^m$ comprises those possible transmission vectors $s \in Q_k^m$ whose respective element s(m) is assigned a binary pattern b(m) in such a manner that there is a 1 at a kth bit position of an mth transmitting antenna.

It is thus true for the complementary partial value set $\overline{Q_k^m}$ that it describes those possible transmission vectors $s \in \overline{Q_k^m}$ which are assigned a 0 at a kth bit position of an mth transmitting antenna.

The number of symbol vectors $|Q_k^m|$ and $|\overline{Q_k^m}|$ contained in $Q_k^m$ and $\overline{Q_k^m}$ is thus $$|Q_k^m| = |\overline{Q_k^m}| = \frac{1}{2}|Q| \quad (6)$$

An algorithm for sphere decoding is disclosed, for example, in "A new Reduced-Complexity Sphere Decoder For Multiple Antenna Systems", Albert M. Chan, Inkyu Lee, 2002 IEEE, "On the Sphere Decoding Algorithm I. Expected Complexity", B. Hassibi, H. Vikalo, IEEE Transactions on Signal Processing, vol. 53, no. 8, pp. 2806-2818, Aug. 2005 and in "VLSI Implementation of MIMO Detection Using the Sphere Decoding Algorithm", A. Burg, M. Borgmann, M. Wenk, M. Zellweger, IEEE Journal of Solid State Circuits, vol. 40, no. 7, Jul. 2005.

These methods according to the prior art can be used to solve equation (3), to determine the shortest Euclidean distance and thus to ascertain the symbol vector $s_{min}$ which was transmitted with the greatest degree of probability.

These approaches are thus used for sphere decoding for a hard decision receiver concept.

For this purpose, QR decomposition of the channel matrix H is carried out, Q representing a Hermitian matrix, where $Q^{-1}=Q^T$, and R representing the upper triangular matrix.

Equation (2) can therefore be expressed by $$d^2 = \|y - Hs\|^2 = \|y - QRs\|^2 \quad (7)$$
$$= \|Q(\hat{y} - Rs)\|^2$$
$$= \|\hat{y} - Rs\|^2$$

where $$\hat{y} = Q^{-1} y \quad (8)$$

Since the matrix Q represents only a Hermitian rotation matrix, it can be ignored for the distance calculation. On account of the triangular structure of the R matrix in the upper region, the Euclidean distance $d^2$ can be divided, in accordance with equation (7) and within the number of transmitting antennas $N_{Tx}$, into Euclidean partial distances $d_m^2$ which can be represented in a tree structure.

Such a search tree comprises a number of levels corresponding to the number of transmitting antennas $N_{Tx}$, each level l being assigned a corresponding transmitting antenna m using $l = N_{Tx} - m + 1$. Subsequent nodes which correspond to the possible QAM symbols $s(m) \in Q^m$ from the set of symbols are inserted on each level l, the number of subsequent nodes $|Q^m|$ being prescribed by the type of modulation in a transmitting antenna m.

Figure 1:
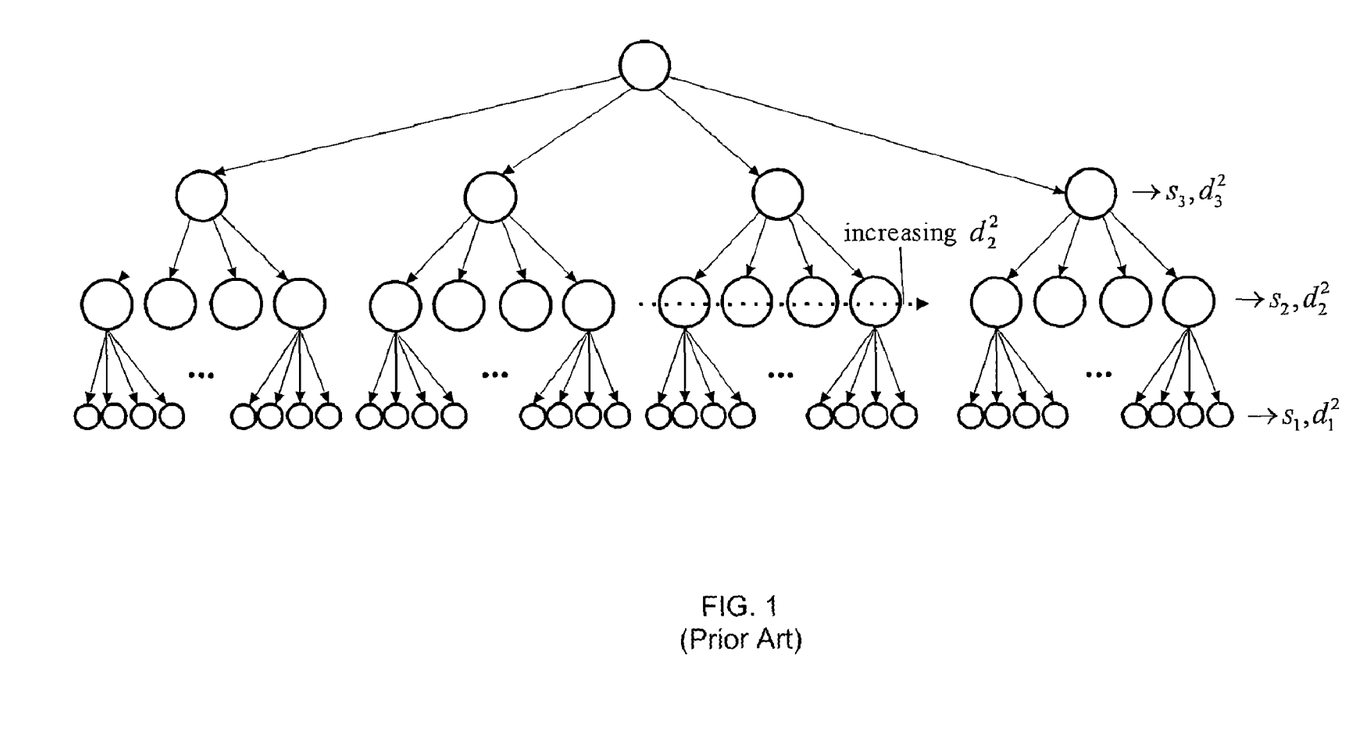
FIG. 1 shows a tree structure of a search tree from the prior art for an example with $N_{Tx}=3$, $N_{Rx}=3$ and QPSK modulation.

FIG. 1 illustrates an example with $N_{Tx}=3$, $N_{Rx}=3$ and QPSK type of modulation for all transmitting antennas. This shows that the QAM symbols s(3) are on the uppermost level, while the elements s(1) are arranged on the lowermost level of the tree structure.

It is furthermore assumed that the subsequent nodes which are assigned to the same predecessor node are arranged in such a manner that the corresponding Euclidean partial distances $d_m^2$ increase from left to right, as is likewise illustrated in FIG. 1.

$$d^2 = \left\| \begin{pmatrix} \hat{y}(1) \\ \hat{y}(2) \\ \hat{y}(3) \end{pmatrix} - \begin{pmatrix} r(1,1) & r(1,2) & r(1,3) \\ 0 & r(2,2) & r(2,3) \\ 0 & 0 & r(3,3) \end{pmatrix} \begin{pmatrix} s(1) \\ s(2) \\ s(3) \end{pmatrix} \right\|^2 \begin{array}{l} \to d_1^2 \\ \to d_2^2 \\ \to d_3^2 \end{array} \quad (9)$$

$$d^2 = d_1^2 + d_2^2 + d_3^2$$

In order to find the symbol vector $s_{min}$ which was sent with the highest degree of probability and for which the Euclidean distance according to equation (7) is thus minimal, a maximum sphere radius $r_{max}^2$ is selected in such a manner that the symbol vector $s_{min}$ is reliably contained in said sphere radius.

Figure 2:
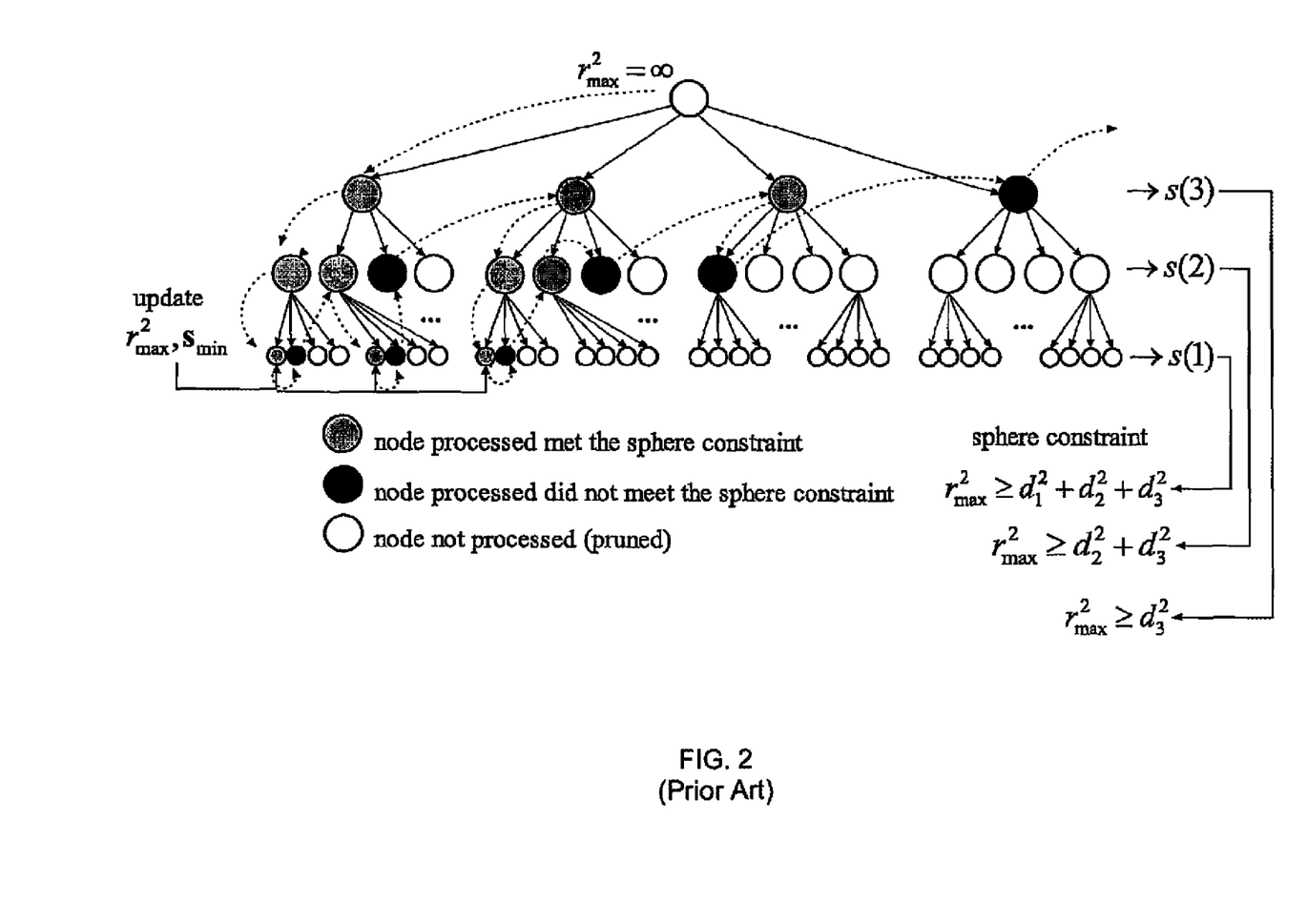
FIG. 2 shows an example of an iterative deepening search using a sphere decoder from the prior art with $N_{Tx}=3$, $N_{Rx}=3$ and QPSK modulation.

FIG. 2 shows an example of such a deepening search for $N_{Tx}=3$, $N_{Rx}=3$ and QPSK modulation for all transmitting antennas. The search pointer runs down through the tree structure to the lower level as long as the sphere constraints $$\text{sphere constraint} = \begin{cases} r_{max}^2 \geq d_3^2 & \text{for level } l = 1 \\ r_{max}^2 \geq d_2^2 + d_3^2 & \text{for level } l = 2 \\ r_{max}^2 \geq d_1^2 + d_2^2 + d_3^2 & \text{for level } l = 3 \end{cases} \quad (10)$$

are met for each level.

If the sphere constraint condition is no longer satisfied at a particular node of a level l, the next node arranged on the level l would likewise not satisfy the sphere constraint condition on account of the arrangement of the subsequent nodes and the search is continued at the level l−1. As soon as the search reaches the lowermost level, the maximum sphere radius $r_{max}^2$ is updated in accordance with the formula $$r_{max}^2 = d_1^2 + d_2^2 + d_3^2 \quad 11)$$

and the symbol vector $s_{min}$ is assumed in accordance with the search path.

According to the prior art, the method described below is known for a soft decision sphere decoder.

The number of bits sent using the mth transmitting antenna is given, for example, by $N_{bits}^m$.

The total number of bits transmitted using all of the transmitting antennas is thus $$N_{bits} = \sum_{m=1}^{N_{Tx}} N_{bits}^m \quad (12)$$

As shown in formula (5), two minimum Euclidean distances must be determined in order to calculate one soft bit $\rho_k^m$, with the result that, in total, $2 \ast N_{bits}$ transmission vectors $s_{min}$ must be found in order to be able to state all $\rho_k^m$.

For the abovementioned example with $N_{Tx}=3$, $N_{Rx}=3$ and QPSK modulation, this means, for example, that a total of 4 transmission vectors $s_{min}$ according to (3), but with $s_{min} \in Q_1^1$, $s_{min} \in \overline{Q_1^1}$, $s_{min} \in Q_2^1$ and $s_{min} \in \overline{Q_2^1}$, have to be found in order to calculate $\rho_k^m$ for the first transmitting antenna m=1. 4 transmission vectors $s_{min}$ likewise need to be respectively determined for all further transmitting antennas, as shown in the following equation:

$$\begin{pmatrix} \rho_1^1 & \rho_2^1 \\ \rho_1^2 & \rho_2^2 \\ \rho_1^3 & \rho_2^3 \end{pmatrix} \to s_{min} \in \begin{pmatrix} Q_1^1 & \overline{Q_1^1} & Q_2^1 & \overline{Q_2^1} \\ Q_1^2 & \overline{Q_1^2} & Q_2^2 & \overline{Q_2^2} \\ Q_1^3 & \overline{Q_1^3} & Q_2^3 & \overline{Q_2^3} \end{pmatrix} \quad (13)$$

The sphere decoder (LSD, list sphere decoding) described in Approaching MIMO Channel Capacity With Soft Detection Based on Hard Sphere Decoding, Renqiu Wang, Georgios B. Giannakis, WCNC 2004/IEEE Communication Society is based on a hard decision sphere decoder for calculating the soft bits and for solving equation (5).

$N_{bits}+1$ deepening search runs are required for this purpose, each deepening search being carried out with a search tree whose structure has been changed.

A transmission vector $s_{min}$ is first of all determined using a hard decision decoder, as already described further above. Since this transmission vector is $s_{min} \in Q$, it can also be associated with $s_{min} \in Q_k^m$ and $s_{min} \in \overline{Q_k^m}$, as shall be explained below for each antenna m and each bit k using an example.

If the transmission vector $s_{min}$ is determined in accordance with equation (3), the next transmission vector, taking into account all possibilities for $s \in Q$, is, for example $$s_{min} = \begin{pmatrix} s_{min}(1) \\ s_{min}(2) \\ s_{min}(3) \end{pmatrix} = \begin{pmatrix} 1+j \\ 1-j \\ -1+j \end{pmatrix} \rightarrow \begin{pmatrix} b(1) \\ b(2) \\ b(3) \end{pmatrix} = \begin{pmatrix} 11 \\ 10 \\ 01 \end{pmatrix} \quad (14)$$

where $b(1)=[11]$ expresses the bit pattern associated with $s_{min}(1)$.

The symbol vector $s_{min}$ is thus likewise the next symbol vector for the following subsets:

$$s_{min} \in \begin{pmatrix} Q_1^1 & Q_2^1 \\ Q_1^2 & \overline{Q_2^2} \\ \overline{Q_1^3} & Q_2^2 \end{pmatrix} \rightarrow 1 \text{ deepening search} \quad (15)$$

Therefore, for the example given, the next symbol vector $s_{min}$ must still be found for the complementary subset:

$$\underbrace{s_{min} \in \overline{Q_1^1}, s_{min} \in \overline{Q_2^1}, s_{min} \in \overline{Q_1^2},}_{N_{bits} \text{ deepening searches}}$$
$$s_{min} \in Q_2^2, s_{min} \in Q_1^3, \text{ and } s_{min} \in Q_2^2,$$

In addition to this initial first deepening search, further $N_{bits}$ deepening searches must therefore subsequently be carried out. However, each further deepening search respectively requires a modification to the search tree illustrated in FIG. 2 in order to find the symbol vector $s_{min} \in Q_k^m$ or $s_{min} \in \overline{Q_k^m}$.

Since $Q_k^m$ or $\overline{Q_k^m}$ each only has $\frac{1}{2}|Q|$ possible transmission symbol vectors s, the number of subsequent nodes on the lth level of the tree ($l=N_{Tx}-m+1$) is respectively halved. One disadvantage of this solution according to the prior art is thus that this method requires $N_{bits}+1$ deepening searches in order to calculate the soft bits for all of the bits sent using $N_{Tx}$ transmitting antennas. A further disadvantage is that the individual searches are highly redundant since the search trees at least partially overlap.

The object of the invention is thus to specify a method and an arrangement for generating soft bit information in a receiver of a multiple antenna system, which is used to reduce the calculation complexity for generating the soft bit information.

In terms of the method, the object is achieved, according to the invention, by virtue of the fact that the iterative deepening search for the mth antenna is carried out in two substeps, in which case, in the first substep, when the last element of s is not assigned to the mth antenna, s is rotated in such a manner that m is associated with the last element of s, that the channel matrix H is likewise rotated and QR decomposition of the channel matrix H is carried out, that, in the second substep, the iterative deepening search is carried out using a search radius in the form of a vector $$r_{max}^2 = \lfloor r_{max}^2(Q_1^m), r_{max}^2(\overline{Q_1^m}), \ldots r_{max}^2(Q_{N_{bits}}^m), r_{max}^2(\overline{Q_{N_{bits}}^m}) \rfloor,$$

in which $N_{bits}^m$ denotes the number of bit positions in the mth antenna, that the comparison $\lfloor r_{max}^2(\ldots), r_{max}^2(\ldots) \rfloor \geq d^2$ is carried out for a search radius vector $r_{max}^2$ and the search radius is adapted by setting the vector element $r_{max}^2(\ldots)$ of the search radius vector $r_{max}^2$ to the value of the Euclidean distance corresponding to the condition satisfied, that the iterative deepening search is carried out as long as at least one search radius $r_{max}^2(\ldots)$ from the radius vector $r_{max}^2$ satisfies the condition $\lfloor r_{max}^2(\ldots), r_{max}^2(\ldots) \rfloor \geq d^2$ or the comparisons with all of the transmission symbols s(m) of all $N_{Tx}$ antennas have been carried out, that the soft bit information $\rho_k^m$ for the antenna m is output, and that the substeps of the method are run through again until all of the soft bit information $\rho_k^m$ has been determined for all $N_{Tx}$ antennas.

In contrast to the prior art, the inventive iterative deepening search is carried out in two sub steps.

The first substep checks whether the last element of s is assigned to the mth antenna. If this is the case, the method continues with the second substep.

The inventive deepening search preferably begins with the search for $s_{min} \in Q_k^m$ or $s_{min} \in \overline{Q_k^m}$ (for all k), m being the last element $s(N_{Tx})$ of the transmission vector s. Consequently, all soft bits $\rho_k^m$ can be calculated for $m=N_{Tx}$ in accordance with the deepening search.

If the last element of s is not assigned to the mth transmitting antenna, s is rotated in such a manner that m is associated with the last element of s; the channel matrix H is also concomitantly rotated in this case. QR decomposition of the channel matrix H is then required.

In the second substep, the actual iterative deepening search is then carried out using a search radius in the form of a vector $$r_{max}^2 = \lfloor r_{max}^2(Q_1^m), r_{max}^2(\overline{Q_1^m}), \ldots r_{max}^2(Q_{N_{bits}}^m), r_{max}^2(\overline{Q_{N_{bits}}^m}) \rfloor.$$

This search radius vector $r_{max}^2$ comprises a plurality of search radii $r_{max}^2(\ldots)$ which are each assigned to the individual deepening searches $s_{min} \in Q_k^m$ and $s_{min} \in \overline{Q_k^m}$ which are assigned to the transmitting antenna $m=N_{Tx}$. During the deepening search, a total of $N_{bits}^m$ individual search radii $r_{max}^2(\ldots)$ are taken from the radius vector $r_{max}^2$ax and combined to form a multiple sphere constraint. This multiple sphere constraint is always reformed during the deepening search as soon as the search reaches the uppermost level $l=1$ of the search tree. In this case, the bit pattern b(m) assigned to a QAM symbol s(m) on level $l=1$ is taken into account. The radius $r_{max}^2(Q_k^m)$ can then be selected for each of the elements of $$b(m) = \lfloor b_1^m, b_2^m, \ldots, b_{N_{bits}^m}^m \rfloor, \text{ if } b_k^m = 1,$$

or $r_{max}^2(\overline{Q_k^m})$ is selected if $b_k^m=0$.

Figure 3:
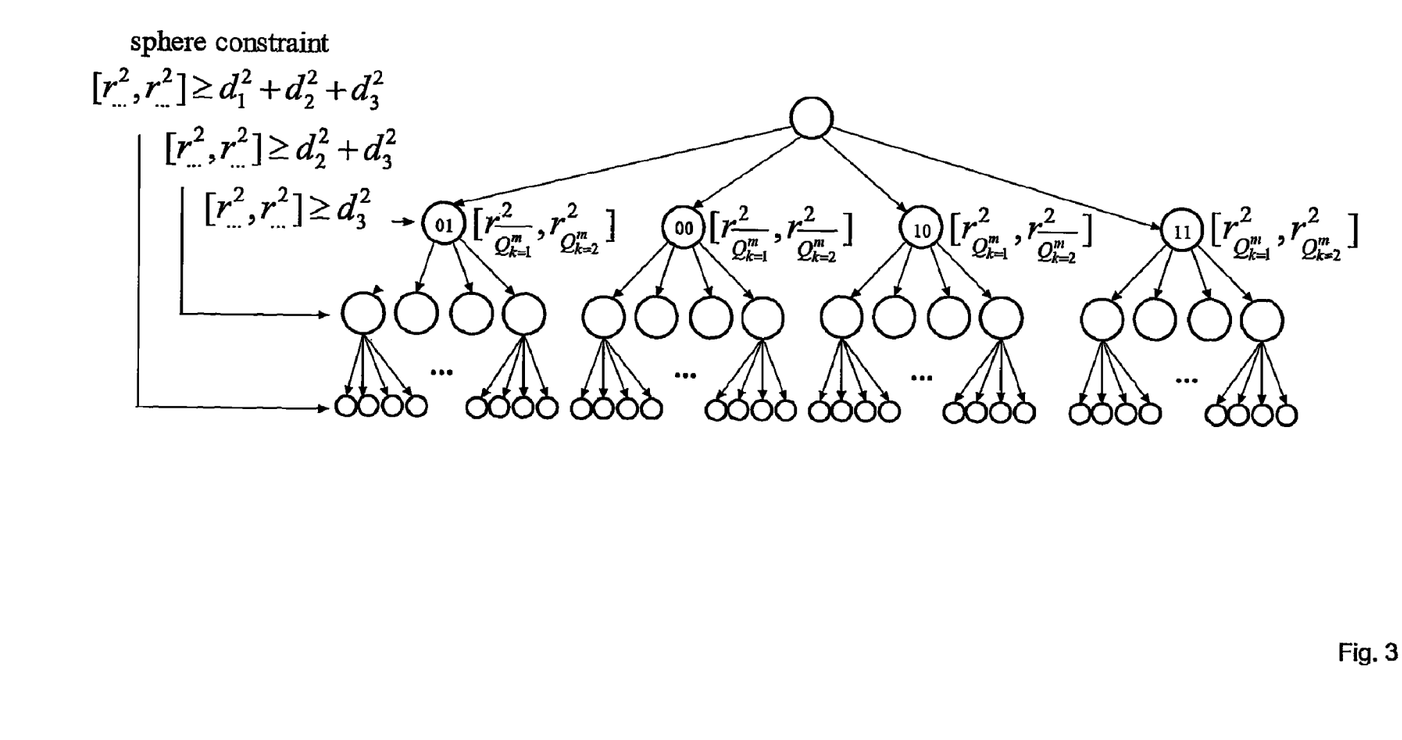
FIG. 3 shows an example of an inventive deepening search using the inventive search radius $r_{max}^2$ in the form of a vector.

In this respect, FIG. 3 shows one example of the selection of the multiple sphere constraint $\lfloor r_{max}^2(\ldots), r_{max}^2(\ldots) \rfloor$ for $N_{Tx}=N_{Rx}=3$ and QPSK.

The iterative deepening search is carried out according to the same scheme as the deepening search in FIG. 2. However, instead of an individual sphere constraint, use is now made of a multiple sphere constraint comprising a total of $N_{bits}^m$ individual search radii. The Euclidean partial distances $d_1^2$, $d_2^2$ and $d_3^2$ likewise correspond to those from equation (9). However, so that the deepening search shown in FIG. 3 can be continued downward, it is necessary to check the multiple sphere constraint which is met as soon as at least one element of the multiple sphere constraint $[r_{max}^2(\ldots), r_{max}^2(\ldots)]$ is $\geq d_1^2$, $d_1^2+d_2^2$ or $d_1^2+d_2^2+d_3^2$, depending on the level l, as illustrated in FIG. 3. If none of the radii contained in the multiple sphere constraint satisfies the above requirement, the search must be continued further at level l-1. At the lowest level l=$N_{Tx}$, all $r_{max}^2(Q_k^m)$ or $r_{max}^2(\overline{Q_k^m})$ from the selected sphere constraint may now be adapted according to equation (11) as long as it is actually a minimization of $r_{max}^2(Q_k^m)$ or $r_{max}^2(\overline{Q_k^m})$. In this case, the current symbol vector is also stored as the result of the search for $s_{min} \in Q_k^m$ or $s_{min} \in \overline{Q_k^m}$ in accordance with the search path.

If, during the further deepening search, the level l=1 is reached again, a new multiple sphere constraint is selected, as illustrated in FIG. 3.

The deepening search just described is continued until either the entire search tree has been passed through or the following termination criterion T has been satisfied. If the condition $r_{max}^2(Q_k^m) \geq d_3^2$ or $r_{max}^2(\overline{Q_k^m}) \geq d_3^2$ is not satisfied for an individual radius from the multiple sphere constraint $\lfloor r_{max}^2(\ldots), r_{max}^2(\ldots) \rfloor$ at the level l=1, the search for $s_{min} \in Q_k^m$ or $s_{min} \in \overline{Q_k^m}$ can be considered to be concluded. The termination criterion T is consequently satisfied when all of the searches for $s_{min} \in Q_k^m$ or $s_{min} \in \overline{Q_k^m}$ have already been considered to be concluded.

All $s_{min} \in Q_k^m$ or $s_{min} \in \overline{Q_k^m}$ for all k but only for m=$N_{Tx}$ are output as the result of the deepening search just described. Consequently, all soft bits $\rho_k^m$ for the transmitting antenna m=$N_{Tx}$ can also be calculated after the deepening search has been concluded.

In order to calculate the soft bits for m≠$N_{Tx}$ and to carry out the corresponding search for $s_{min}$, the transmission vector s must be rotated (Tx rotation) before the described deepening search. If, for example, all $\rho_k^m$ are intended to be calculated for m=$N_{Tx}$-1, the elements of s=[s(1), . . . , s($N_{Tx}$-1), s($N_{Tx}$)]$^T$ must be cyclically rotated once $s_{rot}$=[s($N_{Tx}$), s(1), . . . , s($N_{Tx}$-1)]$^T$ for this purpose such that the elements s($N_{Tx}$-1) can now be found at the last position within s and thus at the uppermost level l=1 of the search tree. However, such a Tx rotation likewise entails a cyclic rotation of the column vectors of H, which thus signifies another QR decomposition. The following equation illustrates this method:

$$d^2 = \underbrace{\left\| y - (h_1, h_2, h_3)\begin{pmatrix} s(1) \\ s(2) \\ s(3) \end{pmatrix} \right\|^2}_{\text{without Tx rotation in order to calculate } \rho_k^m \text{ for } m=3(m=N_{Tx})} = \underbrace{\left\| y - (h_3, h_1, h_2)\begin{pmatrix} s(3) \\ s(1) \\ s(2) \end{pmatrix} \right\|^2}_{\text{with Tx rotation in order to calculate } \rho_k^m \text{ for } m=2(m=N_{Tx}-1)} \quad (16)$$

If such a Tx rotation including another QR decomposition of the channel matrix H is therefore carried out, the deepening search described can be used to calculate all further soft bits for m=$N_{Tx}$-1, for example.

The method with its substeps is run through again until the soft bit information $\rho_k^m$ has been determined and output for all $N_{Tx}$ transmitting antennas.

Figure 4:
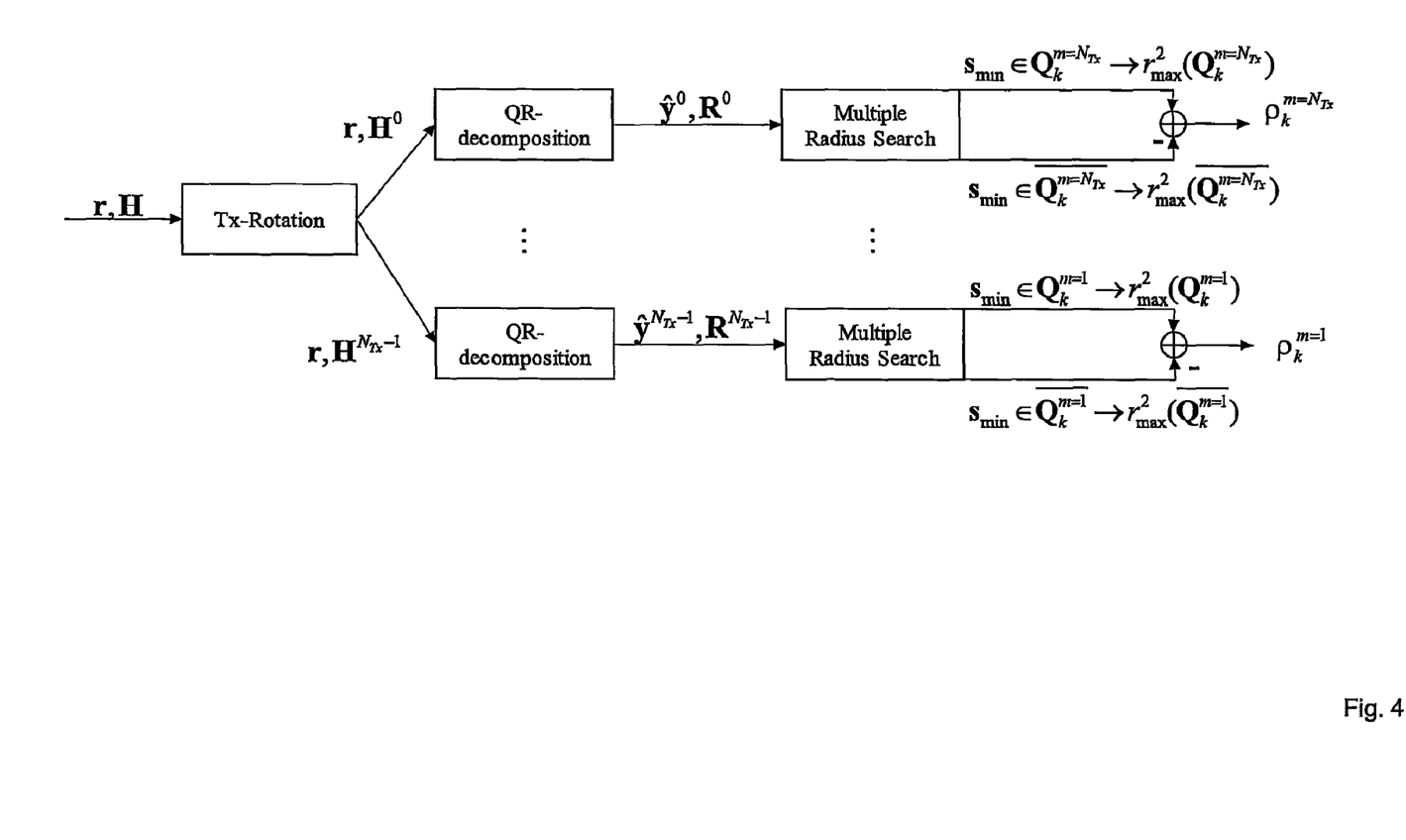
FIG. 4 shows an inventive arrangement for implementing the method.

In this respect, FIG. 4 shows a suitable arrangement. In said figure, r is called the reception vector y and ŷ=$Q^{-1}$·r. In addition, $H^0$ signifies the channel matrix which has not been rotated and is used as a basis for calculating $\rho_k^m$ for m=$N_{Tx}$, whereas $H^{N_{Tx}-1}$ denotes that version of the channel matrix H which has been cyclically rotated ($N_{Tx}$-1) times and can be used to determine $\rho_k^m$ for m=1.

One embodiment of the invention provides for the iterative deepening search to be terminated before all of the soft bit information $\rho_k^m$ is determined for all $N_{Tx}$ antennas.

Another embodiment of the invention provides for the iterative deepening search to be terminated after a prescribed number of search steps has been reached.

For example, prescribing a number of search steps makes it possible for the inventive method for generating soft bit information to be possibly terminated prematurely, that is to say not all of the search steps needed to search a search tree completely are implemented. If the method has not already been terminated before the prescribed number of search steps because, for example, the soft bit information has already been determined and output, the deepening search is terminated when the prescribed number of search steps is reached. On the one hand, this speeds up the search method but it may result in a greater degree of inaccuracy of the soft bit information as a result of premature termination. Other criteria for prematurely terminating the search method are likewise possible.

In terms of the arrangement, the object is achieved, according to the invention, by virtue of the fact that a QR decomposition arrangement for decomposing the QR matrix is connected downstream of a Tx rotation arrangement which is intended to rotate s and H and has an input for an input signal y, that an output of the QR decomposition arrangement is connected to an input of a deepening search arrangement, that the deepening search arrangement has two outputs which are intended to output $s_{min} \in Q_k^{m=N_{Tx}}$ and $s_{min} \in \overline{Q_k^{m=N_{Tx}}}$ and are each connected to an input of a summing arrangement, and that the summing arrangement has an output for outputting an item of soft bit information $\rho_k^m$.

The vector s, and thus also the channel matrix H, are rotated as required by the invention in the Tx rotation arrangement for rotating s and H. The requisite number of rotations is determined by the number of existing transmitting antennas $N_{Tx}$ since a deepening search must be carried out for each existing transmitting antenna. In the QR decomposition arrangement which is connected downstream of the Tx rotation arrangement, the channel matrix H is decomposed into the Q matrix and the R matrix, as already described.

The iterative deepening search for an mth antenna is carried out in the downstream deepening search arrangement using the inventive search radius $r_{max}^2$ in the form of a vector.

As a result of this deepening search, two minima, namely $s_{min} \in Q_k^{m-N_{Tx}}$ and $s_{min} \in \overline{Q_k^{m-N_{Tx}}}$, are output and are subtracted in the downstream summing arrangement in accordance with equation (5).

This difference is output as the soft bit information $\rho_k^m$ of the mth antenna.

One particular embodiment of the invention provides for a plurality of series circuits comprising a QR decomposition arrangement, a deepening search arrangement and a summing arrangement to be connected downstream of the Tx rotation arrangement in a parallel manner.

This arrangement makes it possible to calculate the soft bits in a parallel manner, which makes it possible to speed up determination of the soft bit information $\rho_k^m$. In this case, it is possible to connect two or more such series circuits downstream of the Tx rotation arrangement. In one particular case, the number of series circuits corresponds to the number of transmitting antennas $N_{Tx}$.

The invention shall be explained in more detail below with reference to an exemplary embodiment. In the associated drawings.

The following paragraph describes the inventive approach for a soft decision sphere decoder, which results in a significant reduction in the calculation complexity by introducing the inventive search radius $r_{max}^2$ in the form of a vector. This search radius vector $r_{max}^2$ is used to implement a search with a plurality of search radii (multiple radius search). The method also rotates the reception vector y (Tx rotation).

Replacing the "single radius search" with a "multiple radius search" makes it possible for the sphere decoder to calculate all of the soft bits for a transmitting antenna $m=N_{Tx}$ by running through the method once. In order to calculate all of the soft bits of all further transmitting antennas $m \ne N_{Tx}$, a further inventive method step is used, the so-called "Tx rotation".

The inventive method for a soft decision sphere decoder likewise requires QR decomposition of the channel matrix H during a preparatory method step. This has already been represented in equation (7). The search tree for the inventive solution is also comparable to that illustrated in FIG. 2 for a "hard decision sphere decoder".

Instead of a single maximum sphere radius $r_{max}^2$, the inventive search radius $$r_{max}^2 = \lfloor r_{max}^2(Q_1^m), r_{max}^2(\overline{Q_1^m}), \ldots r_{max}^2(Q_{N_{bits}^m}^m), r_{max}^2(\overline{Q_{N_{bits}^m}^m}) \rfloor \quad (17)$$

in the form of a vector is used to determine the soft bit information $\rho_k^m$.

Each element $r_{max}^2(Q_1^m)$ or $r^2(\overline{Q_k^m})$ corresponds to the maximum sphere radius for the depth-oriented search method for determining $s_{min} \in Q_k^m$ and $s_{min} \in \overline{Q_k^m}$.

The depth-oriented search method for this method is carried out in the manner already described further above.

However, a first difference in the inventive method is that, in accordance with the bit pattern $b(N_{Tx})$ assigned to each element $s(N_{Tx})$ on the uppermost level of the tree structure, a maximum of $N_{bits}^m(m=N_{Tx})$ individual elements are selected from the search radius vector $r_{max}^2$ (a multiple sphere constraint) for the inventive deepening search and are combined to form a multiple sphere constraint.

The multiple sphere constraint condition of such a deepening search is then satisfied if at least one element $r_{max}^2(\ldots)$ from the multiple sphere constraint condition satisfies the inequality according to equation (10) or, in other words, the multiple sphere constraint condition is not satisfied if none of its elements $r_{max}^2(\ldots)$ satisfies equation (10).

Therefore, the deepening search runs through the tree structure from the top downward as long as at least one element $r_{max}^2(\ldots)$ from the multiple sphere constraint condition satisfies equation (10) and does not exceed the corresponding partial Euclidean distances.

Accordingly, the search pointer moves down one level when the multiple sphere constraint condition has been satisfied.

If the multiple sphere constraint condition cannot be satisfied, the search is continued further one level up.

The deepening search using the radius vector $r_{max}^2$ is thus used to find $s_{min} \in Q_k^m$ and $s_{min} \in \overline{Q_k^m}$ by means of the method for generating soft bit information.

FIG. 3 illustrates this sequence using the example of $N_{Tx}=3$, $N_{Rx}=3$ and QPSK modulation for all transmitting antennas.

During the inventive deepening search for finding individual $s_{min} \in Q_k^m$ and $s_{min} \in \overline{Q_k^m}$, it is possible to reduce the multiple sphere constraint condition $\lfloor r_{max}^2(\ldots), \ldots, r_{max}^2(\ldots) \rfloor$.

Figure 5:
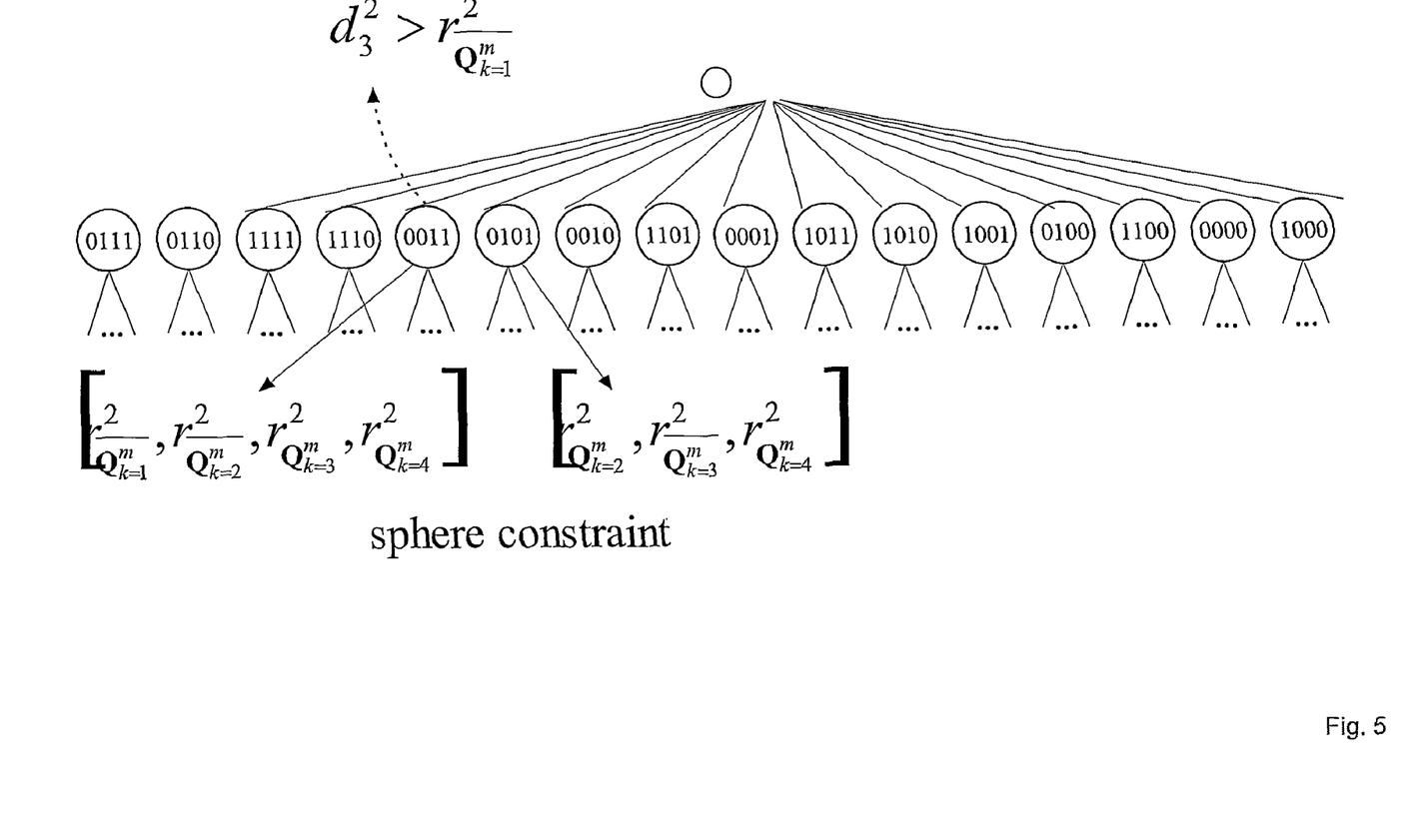
FIG. 5 shows an example of reducing the multiple sphere constraint condition while running through the method in accordance with the invention.

FIG. 5 shows this behavior using the example of a 16-QAM type of modulation. When one of the elements $r_{max}^2(Q_k^m)$ or $r_{max}^2(\overline{Q_k^m})$ from the multiple sphere constraint condition cannot satisfy equation (10) at the uppermost level l=1 of the tree structure, the respective search for $s_{min} \in Q_k^m$ or $s_{min} \in \overline{Q_k^m}$ can be considered to be concluded and $r_{max}^2(\overline{Q_k^m})$ or $r_{max}^2(\overline{Q_k^m})$ can be deleted from the multiple sphere constraint condition for the deepening search according to the method.

The above example of FIG. 5 shows that $r_{max}^2(\overline{Q_{k=1}^m}) \ge d_3^2$ cannot be satisfied. Assuming (already described in FIG. 1) that the elements are arranged in the search tree in such a manner that $d_3^2$ increase from left to right, an element $s(m) \in \overline{Q_{k=1}^m}$, which is arranged further to the right, can no longer reliably satisfy the above condition $r_{max}^2(\overline{Q_{k=1}^m}) \ge d_3^2$ either.

The multiple sphere constraint condition can thus be reduced by the individual radius $r_{max}^2(\overline{Q_{k=1}^m})$ for all subsequent deepening search steps.

The number of elements in the multiple sphere constraint condition is thus reduced. It is obvious that the deepening search can then only be continued further as long as the multiple sphere constraint condition comprises at least one radius.

As soon as the deepening search using the search radius vector $r_{max}^2$ has been concluded, all of the nearest symbol vectors $s_{min} \in Q_k^m$ and $s_{min} \in \overline{Q_k^m}$ for the last transmitting antenna $m=N_{Tx}$ are found.

The determination of the corresponding symbol vector $s_{min}$ for the remaining transmitting antennas $m \ne N_{Tx}$ and the calculation of the corresponding soft bits $\rho_k^m$ are carried out as described below.

As already explained, the introduction of a search using a multiple sphere constraint condition means that all soft bit information $\rho_k^m$ is calculated only for the transmitting antenna $m=N_{Tx}$.

In order to calculate the soft bit information $\rho_k^m$ for an antenna $m \ne N_{Tx}$, the symbol vector s can be cyclically rotated, with the result that each element $s(m)$ respectively appears once at the last position within s.

For the example with $N_{Tx}=3$, $N_{Rx}=3$, the Euclidean distance can be described in accordance with equation (2) as follows $$d^2 = \left\| y - (h_1, h_2, h_3) \begin{pmatrix} s(1) \\ s(2) \\ s(3) \end{pmatrix} \right\|^2$$

without Tx rotation in order to calculate $\rho_k^m$ for $m=3(m=N_{Tx})$

-continued $$= \left\| y - (h_3, h_1, h_2) \begin{pmatrix} s(3) \\ s(1) \\ s(2) \end{pmatrix} \right\|^2$$

with Tx rotation in order to calculate $\rho_k^m$ for $m=2(m=N_{Tx}-1)$ $$= \left\| y - (h_2, h_3, h_1) \begin{pmatrix} s(2) \\ s(3) \\ s(1) \end{pmatrix} \right\|^2$$

with Tx rotation in order to calculate $\rho_k^m$ for $m=1(m=N_{Tx}-2)$ where $h_m$ is the column vector of the channel matrix H.

Equation (18) shows that, as a result of the rotation of s, each element s(m) is at the last position in the vector s once and therefore appears on the uppermost level l=1 of the tree on which the search for the symbol vector $s_{min} \in Q_k^m$ or $s_{min} \in \overline{Q_k^m}$ is being carried out according to the invention.

However, it can also be seen that the rotation of s results in an equivalent rotation of the column vectors $h_m$ of the channel matrix $H = [h_1, \ldots, h_{N_{Tx}}]$.

QR decomposition of the rotated channel matrix $H^0, \ldots, H^{N_{Tx}-1}$ thus provides different Q and R matrices for each rotation step.

In accordance with the method steps mentioned above, the inventive sphere decoder can be constructed as illustrated in FIG. 4.

In a first stage of a Tx rotation arrangement, the input channel matrix H is rotated according to equation (18). A separate QR decomposition is then carried out in the QR decomposition arrangement. The inventive deepening search using the radius vector $r_{max}^2$ is individually carried out for each rotation step in the downstream deepening search arrangement.

The soft bit information $\rho_k^m$ for the associated transmitting antenna m can thus be calculated according to equation (5) for each rotation step and then output.

Achieving the object in this manner requires $N_{Tx}$ search runs in order to calculate all of the soft bit information $\rho_k^m$ for all of the transmitting antennas.

If the complexity of the sphere decoder (LSD) disclosed in Approaching MIMO Channel Capacity With Soft Detection Based on Hard Sphere Decoding, Renqiu Wang, Georgios B. Giannakis, WCNC 2004/IEEE Communication Society is compared with the inventive solution, it is possible to determine that $N_{bits}+1$ search runs with only one sphere constraint (search radius) are required for the LSD sphere decoder. That is to say, the complexity of a deepening search is even dependent on the respective QAM modulation used.

Even if a search using a radius vector $r_{max}^2$ requires greater calculation complexity than a search with only one sphere constraint condition $r_{max}^2$, it can be determined that the overall complexity of the inventive sphere decoder is lower than in the case of the solution which is known from the prior art and uses an LSD sphere decoder.

The invention claimed is:

1. A method for generating soft bit information in a receiver of a multiple antenna system, comprising: forming soft bit information $\rho_k^m$ from a reception vector y using a value set $$Q = \begin{pmatrix} Q^1 \\ Q^m \\ \ldots \\ Q^{N_{Tx}} \end{pmatrix},$$

where $m=(1, 2, \ldots, N_{Tx})$ with the number of $N_{tx}$ transmitting antennas, of possible transmission symbols $Q^m$, with division of the value set Q into partial value sets $Q_k^m$ and $\overline{Q_k^m}$, the partial value set $Q_k^m$ describing those possible transmission vectors $s \in Q$ which are assigned a 1 at a kth bit position of an mth transmitting antenna, and the partial value set $\overline{Q_k^m}$ describing those possible transmission vectors $s \in Q$ which are assigned a 0 at a kth bit position of an mth transmitting antenna, where $k=(1, 2, \ldots, N_{bits}^m)$, $N_{bits}^m$ specifying the number of bit positions in a transmission symbol s(m) determined by the modulation and m specifying the number of a transmitting antenna and k representing the kth bit of a possible transmission symbol of the mth antenna s(m), where $s(m) \in Q^m$, and the soft bit information $\rho_k^m$ is formed according to $$\rho_k^m = \min_{s \in Q_k^m}\{\|y - Hs\|^2\} - \min_{s \in \overline{Q_k^m}}\{\|y - Hs\|^2\}$$

using a channel matrix H, which describes the transmission channel between the transmitter and the receiver, and the transmission vector $s \in Q$ with the possible transmission symbols of the $N_{Tx}$ antennas as vector elements, the Euclidean distance being $d^2 = \|y - Hs\|^2$, the minimum $$\min_{s \in Q_k^m}\{\|y - Hs\|^2\}$$

and the minimum $$\min_{s \in \overline{Q_k^m}}\{\|y - Hs\|^2\}$$

of the Euclidean distances $d^2$ being determined using an iterative deepening search with QR decomposition of the channel matrix H using a search radius $r_{max}^2$ and with adaptation of the search radius $r_{max}^2$, wherein the iterative deepening search for the mth antenna is carried out in two substeps, in which case, in the first substep, when the last element of s is not assigned to the mth antenna, s is rotated in such a manner that m is associated with the last element of s, wherein the channel matrix H is likewise rotated and QR decomposition of the channel matrix H is carried out, wherein, in the second substep, the iterative deepening search is carried out using a search radius in the form of a vector $$r_{max}^2 = \left[ r_{max}^2(Q_1^m), r_{max}^2(\overline{Q_1^m}), \ldots r_{max}^2(Q_{N_{bits}^m}^m), r_{max}^2(\overline{Q_{N_{bits}^m}^m}) \right],$$

in which $N_{bits}^m$ denotes the number of bit positions in the mth antenna, wherein the comparison $[r_{max}^2(\ldots), r_{max}^2(\ldots)] \geq d^2$ is carried out for a search radius vector $r_{max}^2$ and the search radius is adapted by setting the vector element $r_{max}^2(\ldots)$ of the search radius vector $r_{max}^2$ to the value of the Euclidean distance corresponding to the condition satisfied, wherein the iterative deepening search is carried out as long as at least one search radius $r_{max}^2(\ldots)$ from the radius vector $r_{max}^2$ satisfies the condition $[r_{max}^2(\ldots), r_{max}^2(\ldots)] \geq d^2$ or the comparisons with all of the transmission symbols s(m) of all N, antennas have been carried out, wherein the soft bit information $\rho_k^m$ for the antenna m is output, and wherein the substeps of the method are run through again until all of the soft bit information $\rho_k^m$ has been determined for all $N_{Tx}$ antennas.

2. The method as claimed in claim 1, wherein the iterative deepening search is terminated before all of the soft bit information $\rho_k^m$ is determined for all $N_{Tx}$ antennas.

3. The method as claimed in claim 2, wherein the iterative deepening search is terminated after a prescribed number of search steps has been reached.

4. An arrangement for generating soft bit information in a receiver of a multiple antenna system comprising: a QR decomposition arrangement for decomposing a QR matrix that is connected downstream of a Tx rotation arrangement which is intended to rotate transmission vectors s and a channel matrix H and has an input for-reception vector y, wherein an output of the QR decomposition arrangement is connected to an input of a deepening search arrangement, wherein the deepening search arrangement has two outputs which are intended to output $s_{min} \in Q_k^{m=N_{Tx}}$ and $s_{min} \in \overline{Q_k^{m=N_{Tx}}}$ where $$s_{min} = \arg\min_{s \in Q}\{\|y - Hs\|^2\},$$

$\overline{Q_k^{m=N_{Tx}}}$ and $Q_k^{m=N_{Tx}}$ are the partial value sets of the value set Q and $N_{Tx}$ is the number of transmitting antennas, and are each connected to an input of a summing arrangement, and wherein the summing arrangement has an output for outputting an item of soft bit information $\rho_k^m$.

5. The arrangement as claimed in claim 4, wherein a plurality of series circuits comprising a QR decomposition arrangement, a deepening search arrangement and a summing arrangement are connected downstream of the Tx rotation arrangement in a parallel manner.

* * * * *